UNITED STATES PATENT OFFICE.

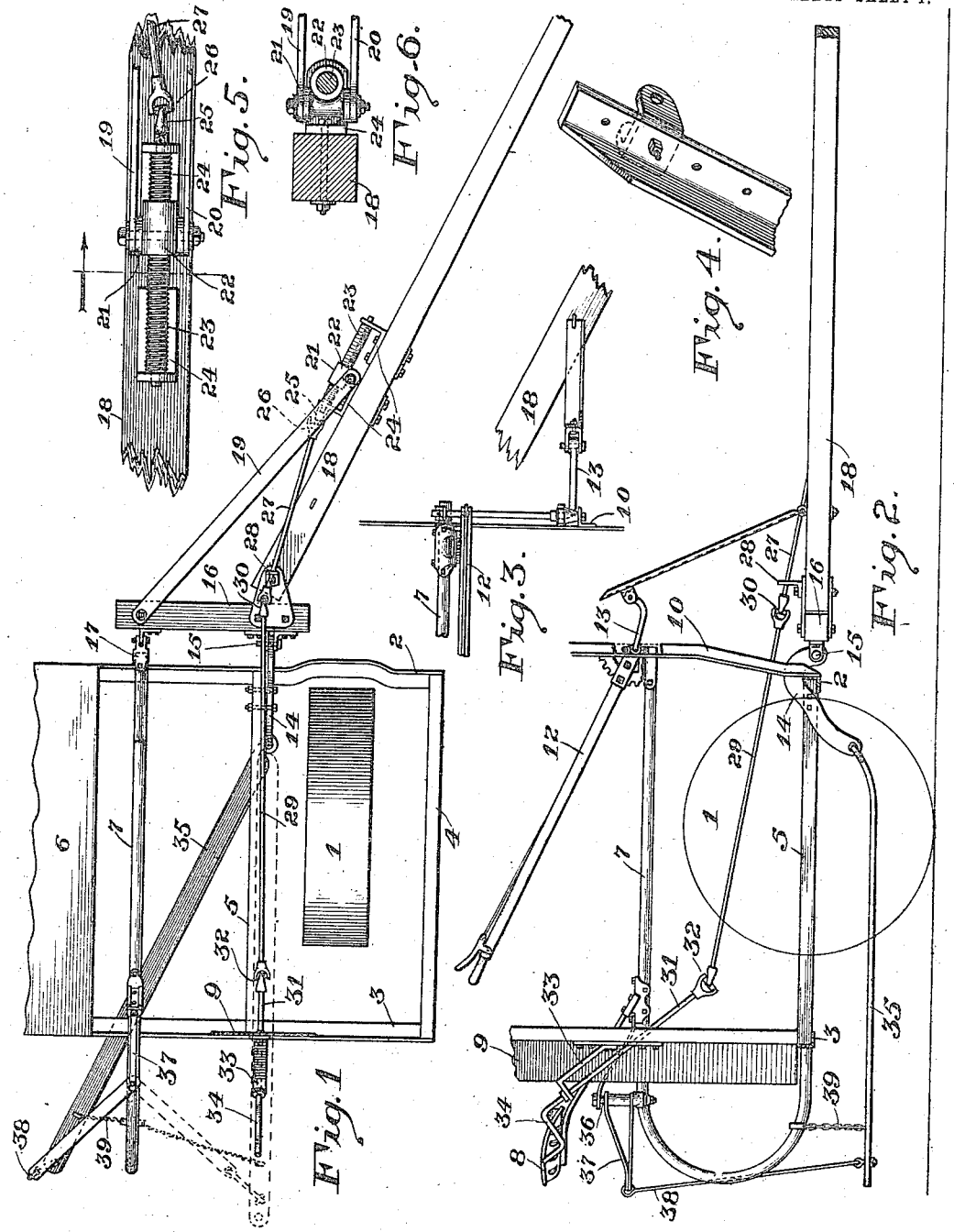

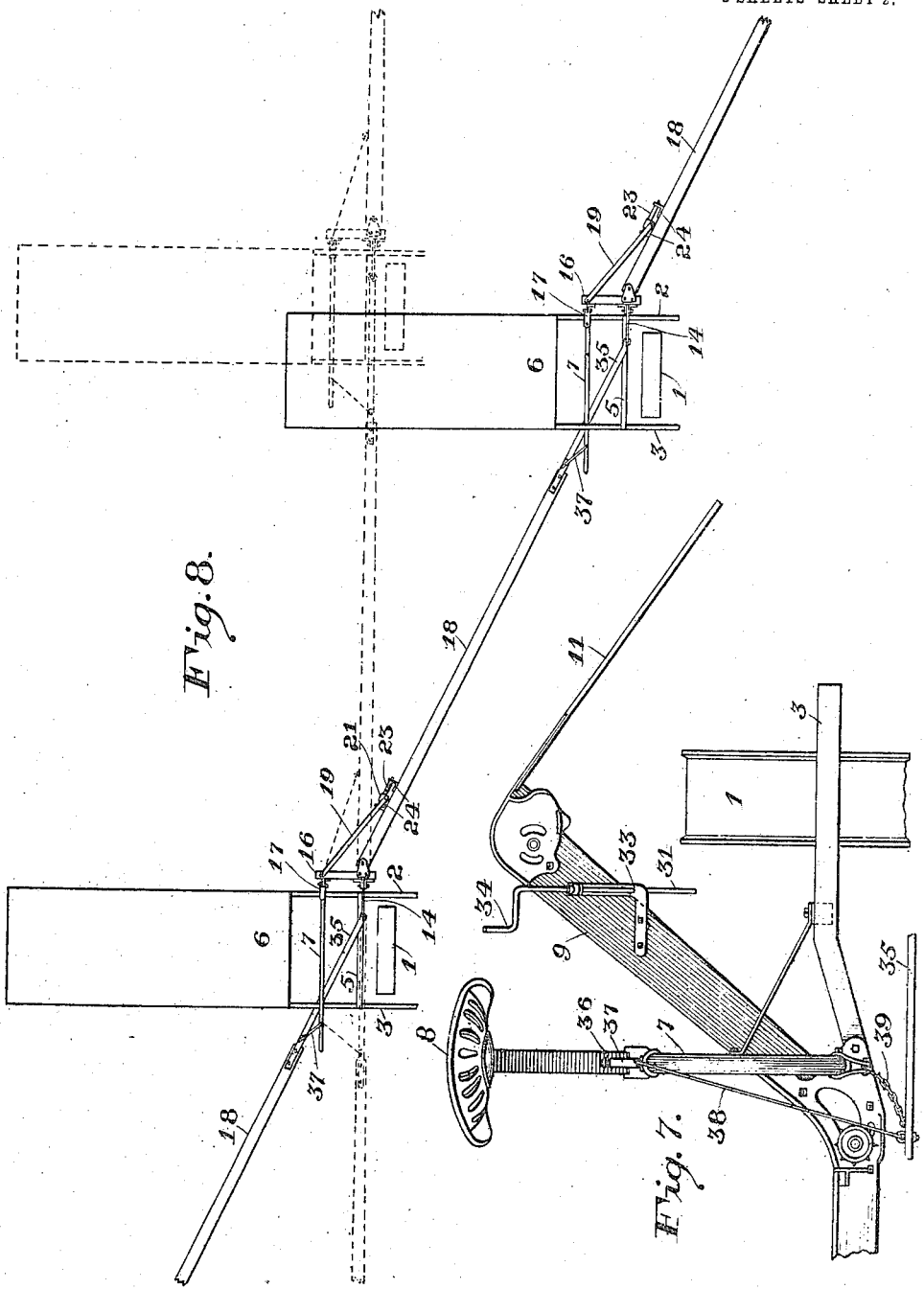

CHARLES PEARSON, OF CHICAGO, ILLINOIS, ASSIGNOR TO INTERNATIONAL HARVESTER COMPANY, A CORPORATION OF NEW JERSEY.

TANDEM DRAFT CONNECTION FOR HARVESTERS.

1,013,894.   Specification of Letters Patent.   Patented Jan. 9, 1912.

Application filed March 2, 1911. Serial No. 611,824.

*To all whom it may concern:*

Be it known that I, CHARLES PEARSON, a citizen of the United States, residing at Chicago, in the county of Cook and State of Illinois, have invented certain new and useful Improvements in Tandem Draft Connections for Harvesters, of which the following is a specification.

My invention relates to an improved draft device whereby a series of grain harvesters or other implements may be connected together in tandem relation and drawn forward by a single source of power, as a traction engine connected with the front machine of the series, and consists in providing draft connections between the different units and between the series and the source of power that may be manipulated by the operator upon the machine in a manner to control the line of advance of one machine independent of the others whereby a greater or less width of swath may be cut by either unit of the series; the object of my invention being to provide a draft connection that may be controlled in a simple and positive manner for the purpose described, strong in construction and efficient in operation. I attain these objects by means of the mechanism illustrated by the accompanying drawings, in which—

Figure 1 is a top plan view of the wheel frame of a grain harvester and a portion of the grain platform thought to be sufficient to illustrate the manner of connecting my improved draft mechanism; Fig. 2 is a side elevation of Fig. 1; Fig. 3 is a detached detail designed to illustrate the manner of connecting the harvester tilting mechanism to the draft tongue; Fig. 4 is a detail of part of the tilting mechanism and represents the upper end of the connecting bar that extends from the tilting crank to the draft tongue; Fig. 5 is a detail of part of the draft mechanism; Fig. 6 is a cross section of Fig. 5; Fig. 7 is a rear end elevation of Fig. 2; and Fig. 8 is a plan view of two harvesters connected together in tandem relation.

The same reference numerals designate like parts throughout the several views.

1 represents the harvester traction wheel; 2 and 3 the front and rear members, respectively, of the wheel frame; 4 and 5 cross members of the wheel frame at the stubbleward and grainward side of the traction wheel, respectively; 6 a part of the grain platform, representing the delivery end thereof; 7 a seat supporting pipe; 8 an operator's seat carried by said pipe; 9 a part of the elevator frame at the rear side of the harvester; 10 a part of the front frame of the elevator; 11 the grain binder deck, and 12 the tilting lever connected with the tilting crank 13, all of these parts being common in this class of machines.

14 represents a draft bracket secured to the front end of the cross member 5 of the wheel frame, having its rear end extending downward and rearward and its front portion turned upward and forward and over the front member 2 of the wheel frame, and then downward and provided with an opening arranged transversely relative to the line of draft of the machine and adapted to receive a connecting pin 15 that connects the bracket with the stubbleward end of a transversely arranged draft bar 16, the opposite end of the bar being pivotally connected with a supplemental draft bracket 17 secured to the wheel frame near the delivery end of the grain platform.

18 represents a draft tongue having its rear end pivotally connected with the stubbleward end of the draft bar 16 in a manner permitting it to swing laterally relative to the line of draft of the machine, and 19 and 20 represent upper and lower draft tongue braces having their rear ends pivotally connected with the grainward end of draft bar 16 and their forward ends with a movable block 21 that is provided with a threaded sleeve portion 22 that receives a screw threaded shaft 23 that is journaled in brackets 24 secured to the grainward side of the draft tongue, the shaft being arranged parallel with the draft tongue and having secured to its rear end a member 25 that forms a part of the universal coupling 26 that connects the shaft with the rearwardly extending shaft 27, having its rear end journaled in a clip 28 secured to the rear end of the draft tongue. The shaft 27 is connected with the supplemental shaft 29 by means of a universal coupling 30, and the rear end of shaft 29 is connected with inclined shaft 31 by means of a universal coupling 32, the shaft 31 passing rearwardly and upwardly and having its upper end journaled in a bracket 33 secured to the harvester frame in rear of the elevator and provided with a crank portion 34 within convenient reach of the operator, whereby the shaft 23 may be rotated in a manner to cause the block 21 to move thereon and cause the draft tongue to swing laterally, the direction thereof being governed by the direction of rotation of the shaft and its associated operative parts.

35 represents a reach bar having its forward end pivotally connected with the rear end of draft bracket 14, and extending rearward below the wheel frame is provided at its rear end with means whereby it may be connected with the draft tongue of a trailing machine, as shown in Fig. 8.

Pivotally mounted upon a vertical stud 36, secured to the rear end of the seat supporting pipe and adapted to swing laterally, is a bracket 37, and 38 represents a link that is flexibly connected at opposite ends with the rear end of the bracket and the rear end of the reach bar. The rear end of the reach bar may swing laterally relative to the line of draft within the limit of the length of chain 39 that connects it with the seat pipe.

By manipulating the crank 34 the operator may vary the angle of the draft tongue relative to the harvester in a manner to vary the path of advance of the latter relative to that of the source of power and either cause the series of machines to trail in substantially the same path as when the machines are being transported, or in different paths, dependent upon the desired width of cut.

What I claim as my invention, and desire to secure by Letters Patent, is:

1. A tandem draft connection for harvesters including, in combination, a draft tongue pivotally connected with the machine in a manner to swing laterally relative to the line of draft of the machine, means for adjusting the front end of said draft tongue laterally, a reach bar having its forward end pivotally connected with the front side of the machine in a manner permitting it to swing freely at its rear end in a lateral direction relative to the line of draft, a bracket pivotally mounted upon the frame of the machine above the rear end of said reach bar in a manner to swing laterally at its rear end, and a link connection between the rear end of said bracket and the rear end of said reach bar whereby the latter is supported.

2. A tandem draft connection for harvesters including, in combination, a draft tongue pivotally connected with the machine in a manner to swing laterally relative to the line of draft of said machine, means for adjusting the said draft tongue laterally, a reach bar having its forward end pivotally connected with front side of the machine in a manner permitting it to swing freely at its rear end in a lateral direction relative to the line of draft of the machine, a bracket pivotally mounted upon the frame of the harvester and extending in rear thereof above the rear end of said reach bar, a link connection between the rear end of said bracket and the rear end of said reach bar, and a flexible connection between the rear end of said reach bar and a fixed part of the machine adapted to limit a lateral swinging movement of said bar in opposite directions.

CHARLES PEARSON.

Witnesses:
 Frank O. Zabilka,
 Ray Pattison.

---

Copies of this patent may be obtained for five cents each, by addressing the "Commissioner of Patents, Washington, D. C."